US009462895B2

(12) United States Patent
Junkell

(10) Patent No.: US 9,462,895 B2
(45) Date of Patent: Oct. 11, 2016

(54) DISPENSING DEVICE

(75) Inventor: Fredrik Junkell, Ljungsarp (SE)

(73) Assignee: MIXMO AB, Hovås (SE)

( * ) Notice: Subject to any disclaimer, the term of this patent is extended or adjusted under 35 U.S.C. 154(b) by 116 days.

(21) Appl. No.: 14/363,048

(22) PCT Filed: Dec. 8, 2011

(86) PCT No.: PCT/SE2011/051487
§ 371 (c)(1),
(2), (4) Date: Nov. 6, 2014

(87) PCT Pub. No.: WO2013/085440
PCT Pub. Date: Jun. 13, 2013

(65) Prior Publication Data

US 2015/0108177 A1 Apr. 23, 2015

(51) Int. Cl.
*G01F 11/20* (2006.01)
*A47F 1/03* (2006.01)
*G07F 11/24* (2006.01)
*G07F 11/36* (2006.01)
*G07F 13/02* (2006.01)

(52) U.S. Cl.
CPC ................. *A47F 1/03* (2013.01); *G07F 11/24* (2013.01); *G07F 11/36* (2013.01); *G07F 13/02* (2013.01)

(58) Field of Classification Search
CPC .......... A47F 1/03; G07F 11/24; G07F 11/36; G07F 12/02
USPC ........................................................... 222/412
See application file for complete search history.

(56) References Cited

U.S. PATENT DOCUMENTS

| | | | | | |
|---|---|---|---|---|---|
| 547,016 | A | * | 10/1895 | Kimball | A01C 7/123 222/133 |
| 2,907,500 | A | * | 10/1959 | Kerkvliet | B65G 33/00 222/311 |
| 3,176,833 | A | * | 4/1965 | Wilkes | B65G 33/14 119/57.7 |
| 3,439,836 | A | | 4/1969 | Ricciardi | |
| 3,581,916 | A | * | 6/1971 | Brumagim | B65G 65/466 414/308 |

(Continued)

FOREIGN PATENT DOCUMENTS

| | | | |
|---|---|---|---|
| WO | 97/08977 | A1 | 3/1997 |
| WO | 2011046501 | A1 | 4/2011 |

OTHER PUBLICATIONS

International Search Report dated Jun. 9, 2012.

*Primary Examiner* — Kevin P Shaver
*Assistant Examiner* — Michael J Melaragno
(74) *Attorney, Agent, or Firm* — Cooper Legal Group LLC

(57) ABSTRACT

The present invention relates to a dispensing device (10) for delivery of items of candy, tea, coffee beans, nuts or the like, said dispensing device comprising: a stationary container (20); a conveyor screw (30) and drive means (50). The conveyor screw (30) comprises a downstream (31) and an upstream member (32) arranged transverse to the longitudinal axis (A) and at least two elongated rods (37) extending helically from the outer periphery of the upstream member (32) to the outer periphery of the downstream member (31).

10 Claims, 4 Drawing Sheets

(56) References Cited

U.S. PATENT DOCUMENTS 3,901,483 A * 8/1975 Lasar ........................ A22C 5/00 366/193
4,305,529 A * 12/1981 Spehrley, Jr. ....... G03G 15/0877 222/228
4,311,257 A 1/1982 Grieco et al.
4,384,643 A * 5/1983 Cone ........................ F16C 35/02 198/672
4,493,442 A * 1/1985 Hanson, Jr. .............. A21C 9/04 222/241
4,802,609 A * 2/1989 Morse ...................... A47F 1/035 222/158
4,852,719 A * 8/1989 Lapeyre ............... B65G 33/265 198/658
5,054,657 A 10/1991 Morse et al.
5,213,232 A * 5/1993 Kraft .................. B65D 83/0409 198/657
5,219,103 A * 6/1993 Carper ................... A47G 19/34 198/531
5,269,233 A * 12/1993 Johnson ...................... F23J 1/06 110/101 CF
5,279,312 A * 1/1994 Wu .......................... A23L 1/223 131/303
5,333,762 A * 8/1994 Andrews ............... G01F 13/005 198/671
5,480,061 A 1/1996 Ellinger
5,607,648 A * 3/1997 Carter ...................... B01J 12/02 422/137
5,826,754 A * 10/1998 Ishaya ....................... A47F 1/03 222/185.1
5,871,081 A * 2/1999 Gaalswyk ............. G01F 13/005 198/502.4
6,435,381 B1 * 8/2002 Waldman .................. A47F 1/03 222/505
7,461,763 B1 * 12/2008 Winn ......................... A47F 1/03 222/158
7,748,575 B2 * 7/2010 Hanaoka ................ B65G 33/22 222/240
8,188,383 B2 * 5/2012 Mikami ............... G01G 19/393 177/25.18
8,540,119 B2 * 9/2013 Gunstad .................. G07F 11/50 222/167
8,594,537 B2 * 11/2013 Hirota ................ G03G 15/0893 198/677
8,834,013 B2 * 9/2014 Bollschweiler ......... B29C 47/10 198/658
2005/0252636 A1 * 11/2005 Kauppila .................. F26B 3/22 165/47
2010/0132210 A1 * 6/2010 Kruger .................... B01F 7/088 34/259
2010/0199850 A1 * 8/2010 Koopman ............. A47J 31/404 99/289 R
2010/0282780 A1 * 11/2010 Babiarz ..................... B65B 1/12 222/226
2011/0089201 A1 * 4/2011 Pape ....................... G01F 13/00 222/412
2011/0108584 A1 * 5/2011 Sirbu Villa ........... A47J 31/404 222/412
2011/0114451 A1 * 5/2011 Moreland ............. B65G 33/00 198/657
2012/0261236 A1 * 10/2012 Farrell ................... B65G 33/32 198/657
2014/0083912 A1 * 3/2014 DeFino ..................... B07B 1/00 209/3.1

* cited by examiner

DISPENSING DEVICE

FIELD OF THE INVENTION

The present invention relates to a dispensing device for delivery of items of candy, tea, coffee beans, nuts or the like.

BACKGROUND OF THE INVENTION

Products like for example candy, nuts, granola, coffee beans, tea, food for dogs/pets etc are either packed and sold in small plastic bags or small boxes containing a selected quantity of the products, alternatively the customers select a desired amount of the products from larger containers in the store. The selected items of products are filled in a bag, cup or box and the price calculated from the overall weight of the selected products, alternatively the price i predetermined for each bag, cup or box.

For example, large quantities of candy are stored within different containers in the stores and the customers select from the different flavors by a spoon. However, this arrangement suffers from severe drawbacks since the candy in the containers are exposed to for example bacteria and dust from the surrounding air and potential customers.

In order to reduce the drawbacks described above, different types of dispensing devices have been presented. Examples of dispensing devices are disclosed in U.S. Pat. No. 5,054,657 and WO11046501.

However, the disclosed dispensing devices suffer from some drawbacks. The major one, common for both the disclosed devices, is that the amount of fed items from the dispensing device when the devices are activated is fluctuating a lot depending on the amount of items in the container at that specific time.

There is consequently a need for a dispensing device that provides a more constant feeding of items even though the amount of items within the container changes.

SUMMARY OF THE INVENTION

The present invention, defined in the appended claims, provides a dispensing device for delivery of items of candy, tea, coffee beans, nuts or the like that fulfils the need defined above.

The dispensing device according to the invention comprises:

- a stationary container having a lower section with a semi-cylindrical inner periphery and a longitudinal axis (A), said container furthermore comprising transverse downstream and upstream ends and a dispensing opening arranged in the downstream end of the container;
- a conveyor screw rotatably arranged around the longitudinal axis (A) in the lower section of the container to feed items towards the dispensing opening;
- drive means that, when activated by a lever or button, rotates the conveyor screw; wherein said conveyor screw comprises a downstream and an upstream member arranged transverse to the longitudinal axis (A) and rotatably supported in the corresponding downstream and upstream end of the container, said downstream and upstream members having an outer periphery and a radius smaller than the semi-cylindrical lower section of the container, said conveyor screw furthermore comprising at least two elongated rods extending helically from the outer periphery of the upstream member arranged in a first angular position in relation to the longitudinal axis A to the outer periphery of the downstream member arranged in a second angular position in relation to the longitudinal axis A, said first angular position and said second angular position are different and said fist angular position is arranged an angle ($\alpha$) advance to the second angular positions when seen in the direction of rotation of the conveyor screw.

The claimed invention fulfils the needs defined above since the dispensing device according to the invention provides a considerably more constant feeding of items from the container. This is achieved by the conveyor screw according to the invention since the limited area of the at least two elongated rods will provide a limited feeding of items when there is a large amount of items within the container and maintain a substantially constant limited flow of items until the container is emptied.

In one embodiment of the invention, the elongated screws has a circular, oval, rectangular, flat or angled cross sectional shape. The cross sectional shape of the elongated rods could be adapted to achieve the desired feeding of the conveyor screw. An increased rod area in the radial plane of the conveyor screw increases the feeding speed of the screw.

In one embodiment of the invention, the positions of the elongated rods around the outer periphery of the upstream and downstream member are symmetrically distributed. The fact that the at least two elongated rods are symmetrically arranged around the upstream and downstream transverse members provides a conveyor screw with the desired constant feeding of items over time since the elongated rods will deliver items to the dispensing opening at constant time intervals.

In one embodiment of the invention, the dispensing opening in the downstream end of the container is arranged at an angle $\omega$ from a vertical plane through the longitudinal axis so that the items in the container must be lifted by the conveyor screw to the dispensing opening, said angle $\omega$ is within the range of 60° to 110°. This position of the dispensing opening ensures that only items lifted by the elongated rods to the dispensing opening exits the container which reduces the risk that further items from the container exits the container once the customer has ended the activation of the dispensing device.

In one embodiment of the invention, the dispensing device furthermore comprises an intermediate plate arranged between the downstream transverse member and the downstream section, and said dispensing opening is formed by an edge of said intermediate plate and said edge is arranged at the angle $\omega$ from the vertical plane through the longitudinal axis (A). This embodiment is advantageous since the position of the dispensing opening could be easily changed by replacing the intermediate plate by another intermediate plate with the edge arranged at another angle $\omega$ and thereby adapt the dispensing device for different products.

In one embodiment of the invention, the longitudinal axis of (A) of the container is inclined an angle Ø in relation to a horizontal plane H and the downstream end at a lower vertical position than the upstream end of the container, said angle Ø is within the range of 2° to 15°. The inclined container facilitates the conveying of items towards the dispensing opening in the downstream end of the container.

In one embodiment of the invention, a lifting device is arranged in the area defined between the downstream end of the elongated rods and the downstream transverse member, said lifting device lifts the items in the container to the dispensing opening. The lifting device is favorable if an increased feeding by the conveyor screw is desired without increasing the dimensions of the elongated rods. The size and shape of the lifting device could be adapted to the specific items dispensed by the device.

in one embodiment of the invention, the lifting device is a triangular plate arranged between the downstream transverse member and the downstream end of the elongated rods. This lifting device is easy to manufacture and provides efficient lifting of many different types of items.

In one embodiment of the invention, the size of the triangular lifting device is adapted to achieve the desired feeding of items from the container.

In one embodiment of the invention, a feeding adjustment plate is arranged transverse to the longitudinal axis (A) between the downstream transverse member and the dispensing opening, said adjustment plate comprises one cut-out portion for each elongated rod of the conveyor screw, said cut-out portions have a size and shape that is adapted to the size and shape of the items within the container to adjust the feeding of items from the container. This embodiment further increases the possibility to achieve the desired constant feeding of items from the container since the size and shape of the cut-out portion could be used to prevent that an increased amount of items suddenly exits the container which for example could happen if several of the items have formed lumps.

In one embodiment of the invention, the rods extending between the upstream and downstream transverse member is arranged a distance from the inside surface of the container. This embodiment is very favorable since the distance between the elongated rods and the inside surface of the container reduces the risk that items of the product in the container end up between the rod and the inside surface of the container and are damaged.

The different embodiment described above could of course be combined and modified in different ways without departing from the scope of the invention that is defined by the claims.

BRIEF DESCRIPTION OF THE DRAWINGS

Different embodiments of the device and selected components of the device according to the invention are illustrated in the figures. The figures are.

DETAILED DESCRIPTION

Figure 1:
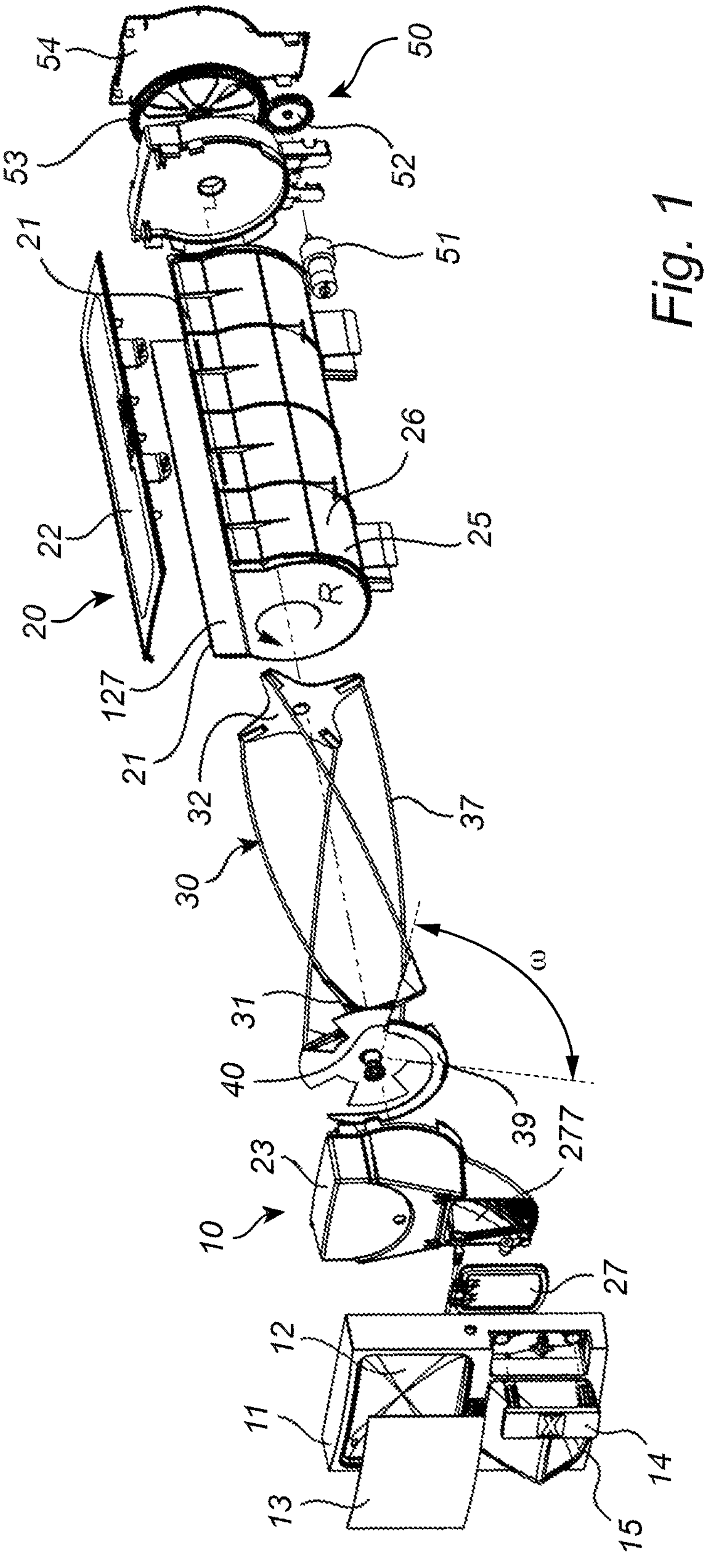
FIG. 1 is an exploded perspective view of different components in the device seen from the downstream end of the device.
Figure 2:
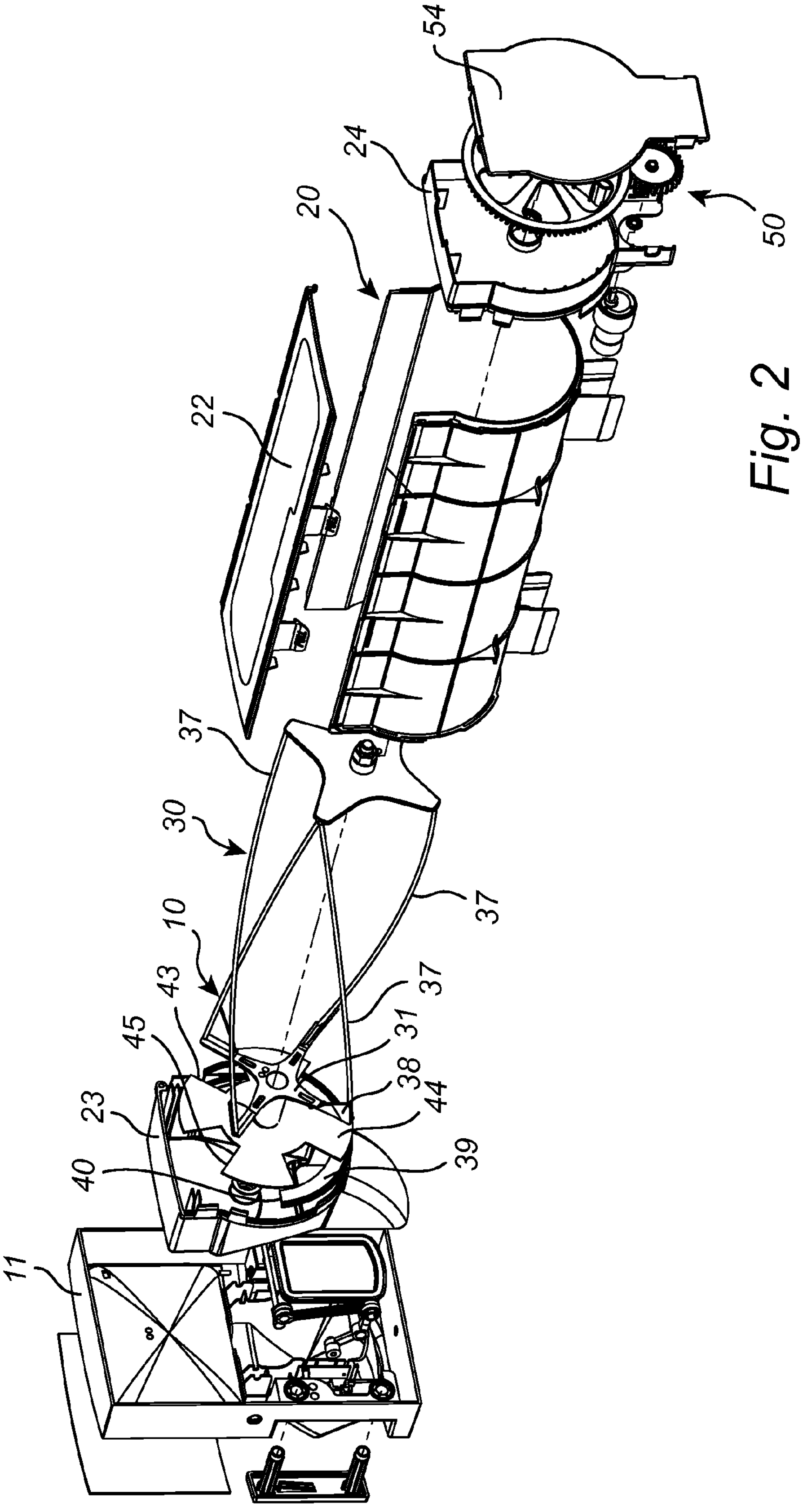
FIG. 2 is an exploded perspective view of different components in the device seen from upstream end of the device.

In FIGS. 1 and 2, different components of a dispensing device 10 are illustrated. The dispensing device 10 is intended for mounting in a cabinet, not illustrated, together with a number of similar dispensing devices 10. Each of the different dispensing devices is filled with for example different flavors of candy, tea, coffee alternatively different types of nuts, screw etc.

The device 10 comprises a substantially rectangular front plate 11 intended to be arranged in the front side of the cabinet towards the customer. The front plate 11 comprises a rectangular area 12 in which an information displaying sign 13 could be arranged in order to describe the content of this particular dispensing device 10. The front plate furthermore comprises a button 14 for activation of the dispensing device. The dispensing is activated when the customer presses the button 14 and ends when the button is released. The dispensed products are delivered via a dispensing outlet 15 in the lower part of the front plate 11. The interface and design of the front plate 11 could be modified in several ways in order to adapt the dispensing device for different types of products and/or customers.

Behind the front plate 11 a container 20 is arranged. Items of the dispensed product are filled in the container 20 via an opening 21 in the top part of the container. The opening 21 is closed by a removable lid 22 with a design corresponding to the shape of the opening 21 in order to seal the container and avoid that for example dust or dirt enters the container 20. The sealed container could be stored for longer periods without adverse affects of the container improves the dispensing device further since the items within the taste of the products in the container and/or the risk that the products getting dry.

The container 20 has a longitudinal axis A substantially transverse to the front plate 11 and comprises a downstream section 23 and an upstream section 24, both arranged substantially transverse to the longitudinal axis A, and an intermediate container section 25 extending between the downstream section 23 and upstream section 24 in order to provide a sealed container 20. The lower part 26 of the container has a substantially semi-cylindrical shape co-axial with the longitudinal axis A of the container. From each longitudinal side of the lower part 26, elongated side walls 127 extends vertically and form a substantially horizontal opening 21 extending along substantially the entire length of the container 20. The length, width and height of the container could be modified in several ways in order to adapt the device for different applications. Furthermore, the container could also be shaped like a tube with a semi-cylindrical upper part identical to the lower part. The opening is still arranged in the upper part and closed by a lid with a curved shape corresponding to the semi-cylindrical shape of the upper part of the container. In the illustrated container the downstream and upstream sections are substantially flat but also could also be curved or angled as long as the shape of the surrounding components corresponds to the shape of the sections.

The downstream section 23 comprises a dispensing opening in order to make it possible to dispense items from the container 20 and a dispensing passage 277 that is connected to the dispensing outlet 15 in the front plate 11 for delivery of the dispensed items. In the dispensing passage a hatch 27 is arranged. The hatch 27 has a shape and size corresponding the size and shape of the dispensing passage 277 in order to open and close the dispensing passage 277. The hatch 27 is moved either manually or by an electrical motor, not illustrated in the figures, and the maneuvering of the hatch 27 coordinated with the activation /deactivation of the dispensing device 10 so that when the activation button is released the hatch 27 closes the dispensing passage in order to seal the container 20 and prevent that particles, or dirt, enters the container as well as reduce the risk that the products are drying within the container. In less complex embodiments of the dispensing device, or embodiments used in combination with products that are not sensitive to changing surrounding conditions the hatch 27 could be eliminated.

In the container a conveyor screw 30 is arranged coaxially with the longitudinal axis A of the container 20. The conveyor screw is illustrated separately in FIG. 3. The length of the conveyor screw 30 along the longitudinal axis A corresponds to the length of the container 20. The conveyor screw 30 comprises a downstream transverse member 31 and an upstream transverse member 32. The downstream and upstream members 31 and 32 have the shape of a cross arranged transverse to the longitudinal axis A. The cross shaped members 31 and 32 have four elongated protrusions 33 extending in radial direction from a common centre 34. The four protrusions 33 are symmetrically arranged forming substantially 90° angles between adjacent protrusions 33 and in the centre 34 of each of the members 33 a support device 35 is extending in the axial direction towards the downstream and upstream sections 23 and 24 in order to rotatably support the conveyor screw within the container 20. The support devices are preferably arranged in corresponding bearings in the downstream and upstream sections 23 and 24 in order to reduce friction. The design of the protrusions could be modified in several ways. In the upstream end of the conveyor screw the protrusions have a larger area while the protrusions in the downstream end preferably have a limited area in the transverse direction to avoid negative influence on the flow of items from the container.

The radial length of the protrusions 33 are smaller than the radius of the lower section 26 of the container 20 to avoid contact between the protrusions 33 and the inside surface of the container 20. From the outer end 36 of each protrusion 33 of the downstream member 31, an elongated rod 37 is extending helically to the outer end 36 of the protrusions 33 of the upstream member 32. The curvature of the helically extending rods 37 depends on the desired feeding speed of the conveyor screw 30 and the intended use of the dispensing device 10, i.e. the size of the container 20. The curvature of the elongated rods 37 is designed so that the rods 37 are extending at a substantially constant distance from the inside surface of the container 20 along the length of the conveyor screw 30. The distance is preferably between 1 and 5 mm. The elongated rods 37 are the only parts of the conveyor screw 30 that connects the downstream transverse member 31 with the upstream transverse member 32. No elongated shaft is extending in the centre of the conveyor screw in order to avoid that the shaft is interrupting the flow of items within the container 20.

In the illustrated embodiment, the elongate rods have a substantially circular cross section with a radius between 3 and 15 mm but other cross-sectional shapes are possible like for example oval, rectangular or flat. Increased dimensions in the radial direction of conveyor screw increases the feeding speed but unfortunately also the risk for damages to the items within the container as well as the risk for breakdowns of the driving means since the loads on the driving means are increase significantly if the area of the elongated rods are increased.

Figure 3:
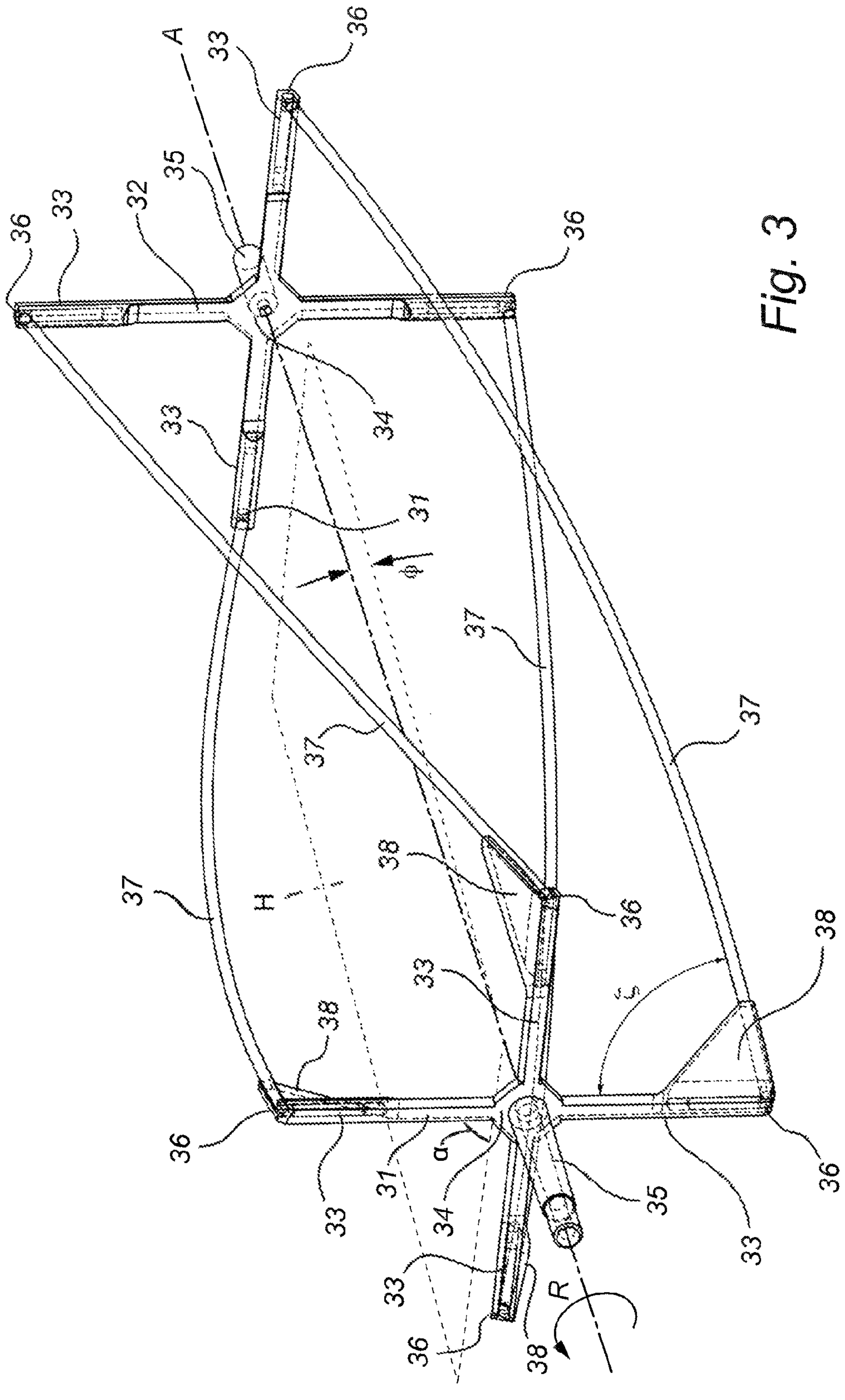
FIG. 3 illustrates a perspective view of a conveyor screw.
Figure 4A:
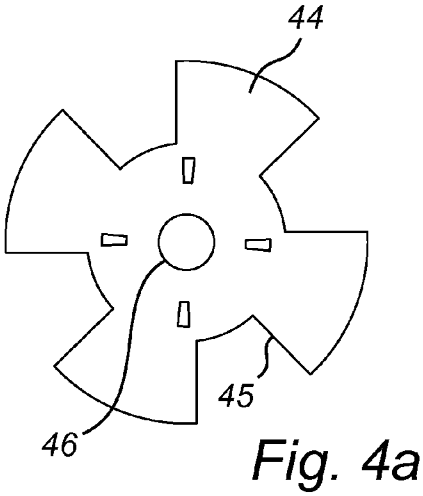
FIG. 4 illustrates different embodiments of the adjustment plate.
Figure 4B:
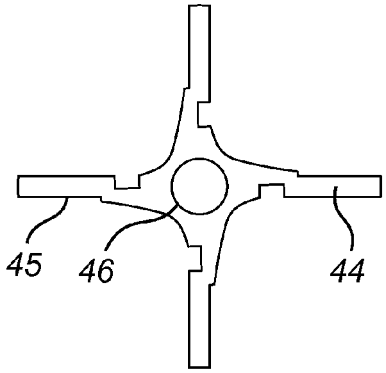
Figure 4C:
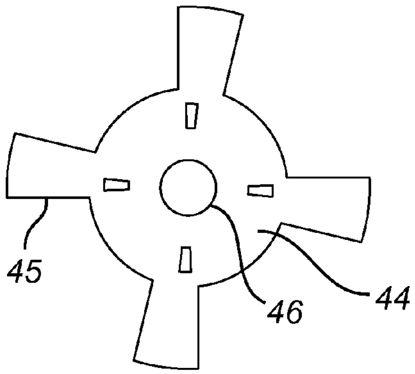
Figure 4D:
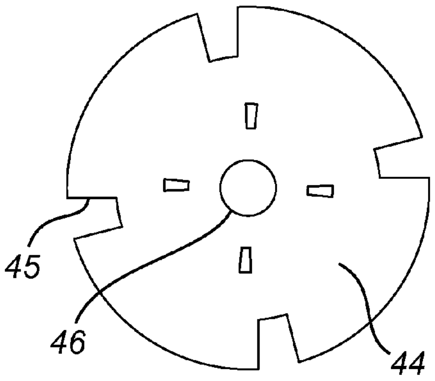

The elongated protrusions 33 of the upstream member 32 are arranged in a first angular position around the longitudinal axis A while the elongated protrusions of the downstream member 31 are arranged in a second angular position around the longitudinal axis A. The first angular position and the second angular position are different from each other in order to generate the helical shape of the elongated rods and the first position is arranged at an angle ($\alpha$) advanced to the second positions when seen in the direction of rotation of the conveyor screw 30. The angle ($\alpha$) is defined as the angle between the upstream and downstream protrusion 33 to which one elongated rod 37 is attached. In FIGS. 1 to 3, the angle ($\alpha$) is substantially 90° but the angle ($\alpha$) depends on the length of the conveyor screw 30 and the desired feeding speed of the conveyor screw 30. A longer screw will require a larger angle ($\alpha$).

The conveyor screw 30 is designed for an intended direction of rotation, indicated by an arrow R in FIGS. 1 and 2, and the desired feeding of items from the container 20 is only achieved when the conveyor screw is rotated in the intended direction.

The number of elongated protrusions of the upstream and downstream member and elongated rods could be changed in order to adapt the conveyor screw for different types of products and the desired feeding properties as long as the number of protrusions of the upstream and downstream transverse member correspond with the number of elongated rods. The number of elongated rods is preferably between two and six arranged symmetrically around the outer periphery of the conveyor screw.

In the downstream end of the conveyor screw 30 according to the illustrated embodiment a substantially perpendicular angle $\xi$ is formed between the downstream end of the rods and the downstream transverse member 31. In the angle $\xi$ between the elongated protrusion 33 and the elongated rod 37, a lifting device 38 is arranged in relation to each rod 37 to provide a device that lifts the items in the downstream end of the container 20 when the conveyor screw 30 is rotated. The lifting device 38 is in the illustrated embodiment a triangular plate arranged between the elongated protrusion 33 of the downstream transverse member 31 and the downstream end of the elongated rod 37. The size and shape of the lifting device is adapted to achieve the desired feeding of items from the container. The area of the lifting device is preferably within the range of 1-10 cm2. The lifting devices improves the performance of the dispensing device since the diameter of the elongated rods could be reduced since the desired lifting of the items in the container is achieved by the lifting devices and the reduced diameter of the rods reduces the loads that the drive means are exposed to and furthermore the possibility for the rods to break down lumps formed in the container is improved. Alternatively, the lifting device is formed as an integrated part of the elongated protrusions.

In the downstream end of the container 20, mean for adjusting and controlling the dispensing from the container 20 is arranged. The means for adjusting the dispensing is cooperating with the lifting devices 38 and comprises an intermediate plate 39 stationary arranged in the downstream end of the container 20 close to the downstream transverse member 31 of the conveyor screw 30 to improve the accuracy of the feeding of products from the container 20. The intermediate plate 39 is arranged in the lower section 26 of the container 20 along the inner surface of the container and has an upper edge 40 arranged in radial direction at an angle $\omega$ above the lowest vertical position of the container 20. The angle $\omega$ is within the range of 45° to 90°. This means that the items in the container must be lifted by the lifting device 38 up to the radial edge 40 of the intermediate plate 39 to be able to exit the container. Only items lifted by the conveyor screw 30 above the edge 40 are dispensed from the container 20 which increases the accuracy of the dispensing considerably. This arrangement furthermore improves the ending of dispensing from the container once the activation of the device has been ended since all items not lifted by the conveyor screw 30 will be prevented from reaching the dispensing opening by the intermediate plate 39. The illustrated intermediate plate 39 do not extend all the way to the centre of the conveyor screw but if a large quantity of items are filled in the container the height of the intermediate plate might be increased. The angle $\omega$ could be changed in order to adapt the device for a particular type and/or size of products.

Adjacent to the intermediate plate, between the intermediate plate 39 and the downstream transverse member 31 of the conveyor screw 30 a feeding adjustment plate 44 is arranged transverse to the longitudinal axis (A). The adjustment plate 44 is substantially circular and designed to cooperate with the conveyor screw 30 and the intermediate plate 39. The adjustment plate 44 has a radius substantially equal to the radius of the transverse downstream member 31 of the conveyor screw 30. The adjustment plate 44 comprises one cut-out portion 45 for each elongated rod 37 of the conveyor screw 30, i.e. four cut-out portions 45, arranged around the outer periphery of the adjustment plate and rotates together with the conveyor screw 30 when the dispensing device is activated. The cut-out portions 45 have a size and shape that is adapted to the size and shape of the items within the container to adjust the feeding of items from the container 20 and further improve the accuracy of the dispensing device 10. The size of the cut-out portion in combination with the design of the intermediate plate makes is possible to adjust the size of the dispensing opening and thereby the amount of items that is able to pass through the dispensing opening. Larger items/products require larger cut-out portions and smaller items/products smaller cut-out portions in order to ensure a constant feeding of items from the container 20.

Different embodiments of the adjustment plate 44 are illustrated in FIGS. 4*a* to 4*d*. The different adjustment plates 44 comprises cut-out portions adapted for dispensing of products of different size and shape but are all intended for use in combination with conveyor screws with four elongated rods 37. The adjustment plates furthermore comprises a centrally arranged hole 46 though which the support device 35 of the conveyor screw extend when the different components of the dispensing device are correctly assembled.

The conveyor screw 30 is rotated by drive means 50 arranged outside the container 20 in the upstream end of the container 20. In the illustrated embodiment the drive means 50 comprises an electric motor 51 driving a first gear wheel 52 that is driving a second gear wheel 53 connected to the support device 35 of the upstream transverse member 32 of the conveyor screw 30. The drive means 50 are activated/deactivated by the button 14 in the front plate 11 of the dispensing device 10. Different types of drive means could however be used. The drive means are covered by a protective cover 54 that is enclosing the first and second gear wheel 52 and 53.

The different components of the dispensing device are supported by a supporting structure, not illustrated in the figures. The supporting structure could have different shapes and site depending on the number of dispensing devices arranged on the supporting structure.

The dispensing device in the figures has been described without any specified dimensions since the dispensing device could be modified in several ways depending on the intended use of the dispensing device. However, if the dispensing device is intended for different flavors/types of candy, the lower part of the container have a radius within the range of 75-200 mm, the angle ($\alpha$) is within the range of 50° to 110° and the axial length of the container within the range of 200-700 mm.

Even though only one embodiment of the dispensing device is illustrated in the figures, the dispensing device could be modified in several different ways without departing from the scope of the invention that is defined by the claims.

The invention claimed is:

1. Dispensing device for delivery of items of candy, tea, coffee beans, nuts or the like, said dispensing device comprising:

a stationary container having a lower section with a semi-cylindrical inner periphery and a longitudinal axis (A), said container furthermore comprising transverse downstream and upstream sections and a dispensing opening arranged in the downstream section of the container;

a conveyor screw rotatably arranged around the longitudinal axis (A) in the lower section of the container to feed items towards the dispensing opening;

drive means that, when activated by a lever or button, rotates the conveyor screw; wherein said conveyor screw comprises a downstream and an upstream member arranged transverse to the longitudinal axis (A) and rotatably supported in the corresponding downstream and upstream section of the container, said downstream and upstream member having an outer periphery and a radius smaller than the semi-cylindrical lower section of the container, said conveyor screw furthermore comprising at least two elongated rods extending helically from the outer periphery of the upstream member arranged in a first angular position in relation to the longitudinal axis A to the outer periphery of the downstream member arranged in a second angular position in relation to the longitudinal axis A, said first angular position and said second angular position are different and said first angular position is arranged at an angle ($\alpha$) advance to the second angular position when seen in the direction of rotation of the conveyor screw, and wherein a feeding adjustment plate is arranged transverse to the longitudinal axis (A) between the downstream transverse member and the dispensing opening, said adjustment plate rotates together with the conveyor screw and comprises one cut-out portion for each elongated rod of the conveyor screw, said cut-out portions have a size and shape that is adapted to the size and shape of the items within the container to adjust the feeding of items from the container.

2. Dispensing device according to claim 1, wherein the elongated rods each has a circular, oval, rectangular, flat or angled cross sectional shape.

3. Dispensing device according to claim 1, wherein the positions of the elongated rods around the outer periphery of the upstream and downstream member are symmetrically distributed.

4. Dispensing device according to claim 1, wherein the dispensing opening in the downstream end of the container is arranged at an angle $\omega$ from a vertical plane through the longitudinal axis (A) so that the items in the container must be lifted by the conveyor screw to the dispensing opening, said angle $\omega$ is within the range of 45° to 110°.

5. Dispensing device according to claim 4, wherein the dispensing device furthermore comprises an intermediate plate arranged between the downstream transverse member and the downstream section, and said dispensing opening is formed by an edge of said intermediate plate and said edge is arranged at the angle $\omega$ from the vertical plane through the longitudinal axis (A).

6. Dispensing device according to claim 1, wherein the longitudinal axis of (A) of the container is inclined an angle Ø in relation to a horizontal plane (H) and the downstream end arranged at a lower vertical position than the upstream end of the container, said angle Ø is within the range of 2° to 15°.

7. Dispensing device according to claim 1, wherein a lifting device is arranged in the area defined between the downstream end of the elongated rods and the downstream transverse member, said lifting device lifts the items in the container to the dispensing opening.

8. Dispensing device according to claim 7, wherein the lifting device is a triangular plate arranged between the downstream transverse member and the downstream end of the elongated rods.

9. Dispensing device according to claim 8, wherein the size of the lifting device is adapted to achieve the desired feeding of items from the container.

10. Dispensing device according to claim 1, wherein the elongated rods extending between the upstream and downstream transverse member are arranged a distance from the inside surface of the container.

* * * * *